United States Patent
Kido et al.

(10) Patent No.: US 9,688,860 B2
(45) Date of Patent: Jun. 27, 2017

(54) METHOD FOR PRODUCING WATER-BASED PIGMENT DISPERSION LIQUID AND WATER-BASED INK FOR INK JET RECORDING

(75) Inventors: Masahiro Kido, Ina-machi (JP); Shinichi Okada, Ina-machi (JP); Atsuo Kobayashi, Niiza (JP); Soetrisno Misawa, Jakarta (ID)

(73) Assignee: DIC CORPORATION, Tokyo (JP)

( * ) Notice: Subject to any disclaimer, the term of this patent is extended or adjusted under 35 U.S.C. 154(b) by 277 days.

(21) Appl. No.: 13/392,330

(22) PCT Filed: Aug. 25, 2010

(86) PCT No.: PCT/JP2010/064379
§ 371 (c)(1),
(2), (4) Date: May 9, 2012

(87) PCT Pub. No.: WO2011/024855
PCT Pub. Date: Mar. 3, 2011

(65) Prior Publication Data
US 2012/0220703 A1    Aug. 30, 2012

(30) Foreign Application Priority Data

Aug. 26, 2009 (JP) ............... 2009-195356
Mar. 30, 2010 (JP) ............... 2010-077588
Jul. 12, 2010 (JP) ............... 2010-157751

(51) Int. Cl.
| | |
|---|---|
| *C09D 11/10* | (2014.01) |
| *C09B 67/00* | (2006.01) |
| *C09B 67/46* | (2006.01) |
| *C09D 11/326* | (2014.01) |
| *C09D 7/14* | (2006.01) |
| *C09D 11/322* | (2014.01) |
| *C09B 67/22* | (2006.01) |

(52) U.S. Cl.
CPC ........ *C09B 67/0022* (2013.01); *C09B 67/009* (2013.01); *C09B 67/0036* (2013.01); *C09D 7/14* (2013.01); *C09D 11/322* (2013.01); *C09D 11/326* (2013.01)

(58) Field of Classification Search
CPC ............................... C09D 7/14; C09D 11/322
USPC .................. 523/161; 524/186, 386, 388, 562
See application file for complete search history.

(56) References Cited

U.S. PATENT DOCUMENTS

| | | | |
|---|---|---|---|
| 2005/0159506 A1* | 7/2005 | Friour et al. ............ | 523/160 |
| 2006/0235106 A1* | 10/2006 | Okada et al. ............ | 523/160 |
| 2009/0202724 A1* | 8/2009 | Arai et al. ............... | 427/256 |

FOREIGN PATENT DOCUMENTS

| | | |
|---|---|---|
| JP | 5-222328 A | 8/1993 |
| JP | 2001-262038 A | 9/2001 |
| JP | 2003-226832 A | 8/2003 |
| JP | 2004-43791 A | 2/2004 |
| JP | 2009-235337 A | 10/2009 |

OTHER PUBLICATIONS

International Search Report of PCT/JP2010/064379, mailing date of Dec. 7, 2010.

* cited by examiner

*Primary Examiner* — Wenwen Cai
(74) *Attorney, Agent, or Firm* — Westerman, Hattori, Daniels & Adrian, LLP

(57) ABSTRACT

A highly efficient method is provided for producing a water-based ink for ink jet recording with which the number of coarse particles in a water-based pigment dispersion liquid is significantly reduced, dispersed particles are made finer, the dispersion stability is improved, the storage stability is improved, and high discharge stability is achieved when a water-based ink for ink jet recording is produced. Particularly, provided is a method for producing a water-based pigment dispersion liquid, the method including kneading a mixture containing a quinacridone type pigment (a), a styrene-acrylic acid type copolymer (c), a basic compound (d), and a polyoxyalkylene glycol or its derivative (e) to prepare a pigment dispersion that is solid at room temperature and mixing a aqueous medium and the pigment dispersion to decrease the viscosity and liquefy the pigment dispersion.

9 Claims, No Drawings

METHOD FOR PRODUCING WATER-BASED PIGMENT DISPERSION LIQUID AND WATER-BASED INK FOR INK JET RECORDING

TECHNICAL FIELD

The present invention relates to a method for producing a water-based pigment dispersion liquid. It also relates to a method for producing a water-based ink for ink jet recording, the method for producing the water-based ink using the method for producing a water-based pigment dispersion liquid and including a diluting step.

BACKGROUND OF THE INVENTION

Water-based ink that uses water as a main solvent has outstanding features such as it possesses little or no fire hazard and it has little or no toxicity such as mutagenicity, unlike solvent ink. This makes water-based ink the mainstream ink for ink jet recording in usages other than industrial usages.

The properties needed for ink used in ink jet recording are, for example, as follows: (1) offering an image having high coloring property, high resolution, high density, and uniformity is created on a recording medium without bleeding, (2) clogging of nozzle tips caused by drying of ink does not occur and discharge stability is high, (3) the drying property of the ink on a recording medium is satisfactory, (4) the image has good fastness, and (5) the long-term storage stability is high.

Previously, dyes have been used as colorants of water-based ink for ink jet recording since dyes have high dissolution stability, cause less nozzle clogging, offer high coloring property, and thus enable high-quality image printing; however, images created with dyes have a problem in that the water resistance and lightfastness are poor.

In order to address this problem, more and more pigments are used as colorants instead of dyes. While pigment ink is expected to achieve high water resistance and lightfastness, the coloring property is poor compared to dyes and nozzle clogging caused by aggregation and sedimentation of pigments arises as a problem. Thus, various studies have been made on specific methods for dispersing microparticulated pigments in water-based media by using polymeric dispersants.

For example, a method has been proposed which includes preparing an aqueous solution by dissolving a water-soluble resin and an alkali component in water, adding a pigment to the aqueous solution followed by thorough stirring, and dispersing the mixture using a high-speed sand mill or the like having high dispersion efficiencies (for example, refer to Japanese Unexamined Patent Application Publication No. 2001-262038).

However, according to this method, it takes a long time for dispersing and the production efficiency has been low. Moreover, the dispersion stability of the pigment in the resulting water-based pigment dispersion liquid has been unsatisfactory.

Under these circumstances, a dispersing method has been proposed which includes a pretreatment step of preliminarily kneading a pigment and a polymeric dispersant (for example, refer to Japanese Unexamined Patent Application Publication No. 2003-226832). This has improved production efficiencies and has made the pigment finer. However, although pigment particles became finer, the dispersion stability of the pigment has been unsatisfactory and thus the storage stability of the ink remains to be improved. In particular, quinacridone type pigments used in producing magenta ink are hydrogen-bonding-type pigments that function as pigments through intermolecular hydrogen bonding and thus pigment particles are strongly aggregated and tend to remain undispersed by forming coarse particles in the ink. Moreover, the pigment particles which have been made finer by dispersion tend to undergo reaggregation. Thus, the dispersionstability has been particularly difficult to achieve.

To address this, a method for producing a water-based pigment dispersion liquid has been proposed in which a quinacridone type pigment, a phthalimidomethylated-quinacridone type compound or additionally a quinacridonesulfonic acid type compound, and an anionic-group-containing organic polymer compound having a glass transition temperature of −20° C. to 60° C. are used (for example, refer to Japanese Unexamined Patent Application Publication No. 2004-043791). This water-based dispersion liquid has good dispersibility and dispersion stability, the particle size does not increase much even when left at high temperature for a long time, and the increase in viscosity is suppressed such that the viscosity can be maintained in a low viscosity range, which makes the dispersion liquid suitable for use in water-based ink for ink jet recording.

However, all of the pigment dispersion processes described above give dispersions containing unsatisfactorily disintegrated pigment particles and coarse particles that are not dispersed sufficiently. Although introduction of the kneading step reduced the number of such coarse particles, removal of coarse particles by centrifugal treatment and filtering treatment is still needed in order for the dispersion to be actually used as water-based ink for ink jet recording. Although the amount of remaining coarse particles can be reduced by introduction of the centrifuging and filtering step, the pigment yield is decreased and the production efficiency is significantly degraded, posing many challenges on the productivity. In particular, use of quinacridone type pigments has made the problem more difficult to resolve.

SUMMARY OF INVENTION

A water-based pigment dispersion liquid is provided in which a pigment is stably dispersed and a good dispersion state is maintained even in long-term storage due to significant reduction of the number of coarse particles unsatisfactorily dispersed. A water-based ink for ink jet recording is provided which is produced from the water-based pigment dispersion liquid and offers good dispersion stability. Methods for producing the water-based pigment dispersion liquid and the water-based ink for ink jet recording are provided. Furthermore, methods for producing a water-based pigment dispersion liquid and water-based ink for ink jet recording are provided which achieve favorable properties described above, take a shorter time for production, and offer high production efficiencies.

The number of coarse particles can be significantly decreased, the conventionally required dispersing step using a disperser can be omitted, and the above-described object can be achieved by using a method for producing a water-based pigment dispersion liquid, the method including a step of kneading a mixture containing a quinacridone type pigment, a styrene-acrylic acid type copolymer having a specific composition, a basic compound, and a specified polyoxyalkylene glycol or its derivative. That is, provided is a method for producing a water-based pigment dispersion liquid, the method including a kneading step of kneading a mixture containing a quinacridone type pigment (a), a styrene-acrylic acid type copolymer (c), a basic compound (d), and a polyoxyalkylene glycol or its derivative (e) to prepare a pigment dispersion that is solid at room temperature and a mixing step of mixing a aqueous medium and the pigment dispersion, in which the polyoxyalkylene glycol or its derivative (e) is at least one selected from the group consisting of a polyoxyalkylene adduct of glycerin, a polyethylene glycol having a hydroxyl value of 50 to 500 mgKOH/g, and a polypropylene glycol having a hydroxyl value of 150 to 700 mgKOH/g.

In the method for producing a water-based pigment dispersion liquid, a quinacridone type pigment derivative is preferably contained in the mixture in the kneading step.

The exact reason why the method for producing a water-based pigment dispersion liquid exhibits a notable effect on reducing the number of coarse particles is not clear but can be presumed as follows.

A process of dispersing a pigment in a medium during kneading is generally considered to undergo following three steps if viewed closely. That is, a step in which a dispersion medium wets the pigment, a step in which a pigment is pulverized under shear force, and a step in which the finely pulverized state of the pigment is stabilized by the adsorption of a resin having a dispersing ability. Dispersing a pigment is basically reversible and, although the pigment can be dispersed, it is difficult to stably maintain the dispersed state unless some measures for suppressing reaggregation of the pigment are taken. Accordingly, the dispersion needs to be stabilized by forming resin adsorption layers on surfaces of pigment particles. In order to stabilize the dispersion, the affinity between the dispersion medium and the pigment particle surfaces and between the dispersion medium and the resin is important. In order for a resin to adsorb onto surfaces of pigment particles, the affinity between the resin and the pigment particle surfaces must be higher than the affinity between the resin and the dispersion medium. On the other hand, the affinity between the resin and the dispersion medium is also important. If the affinity between the resin and the dispersion medium is excessively low, the resin adsorption layers do not orient in a dispersion medium and it becomes difficult to achieve dispersion stability. Regarding the affinity between the pigment particle surfaces and the dispersion medium, the adsorption of the resin to the pigment surfaces is inhibited if the affinity is excessively high. In contrast, if the affinity is excessively low, the process of wetting, which is one of the factors of dispersing mechanisms, does not efficiently proceed and it becomes difficult to conduct dispersion. Thus, the choice of the dispersion medium must be made by considering the balance between the affinity with the pigment and the resin.

If a solvent conventionally used in a dispersion medium is directly used, the affinity between the dispersion medium containing the solvent and the pigment is excessively high, thereby inhibiting adsorption of resin, and therefore failing to obtain a dispersion stability of the pigment and increasing the number of coarse particles. Consequently, a dispersing step using a disperser has been required to reduce the number of coarse particles. In case of using the specific polyoxyalkylene glycol or its derivative (e) of the present invention, the dispersion medium containing it has an adequate degree of affinity to the pigment, and therefore, wetting of the pigment is progressed, adsorption of the resin to the pigment is not inhibited, and the resin becomes in a partial dissolved state, i.e., swelling. As a result, the adsorption of the resin to the pigment is progressed. Accordingly, it is presumed that pulverization of the pigment and stabilization of the dispersion proceed extremely efficiently, the number of coarse particles in the dispersion liquid can be notably reduced, and an additional dispersing step using a dispersion can be omitted.

Since the method for producing a water-based pigment dispersion liquid includes kneading a mixture containing a quinacridone type pigment (a), a styrene-acrylic acid type copolymer (c), a basic compound (d), and a polyoxyalkylene glycol or its derivative (e) to prepare a pigment dispersion that is solid at room temperature and mixing a aqueous medium and the pigment dispersion, disintegration of the pigment into finer particles and the coating process in which the surfaces of disintegrated pigment particles are coated with the resin proceed smoothly and a water-based pigment dispersion liquid can be highly efficiently produced by performing a mixing step after the kneading step. Moreover, the production method helps significantly reduce the number of coarse particles in water-based pigment dispersion and stably maintain the dispersed state of the pigment over a long term. When a water-based ink for ink jet recording is produced from the water-based pigment dispersion liquid produced by the method for producing a water-based pigment dispersion liquid, an ink having good dispersibility and good discharge property and containing fewer coarse particles can be obtained.

DETAILED DESCRIPTION OF THE INVENTION

Various raw materials used in the production methods of the present invention will first be described in detail and then a method for producing a water-based pigment dispersion liquid using these raw materials will be described in detail below.

(Quinacridone Type Pigment)

Commonly known pigment species can be used as the pigment species of the quinacridone type pigment (a). Examples thereof include one of or a mixture of two or more pigments selected from dimethyl quinacridone type pigments such as C.I. pigment red 122, dichloroquinacridone type pigments such as C.I. pigment red 202 and C.I. pigment red 209, and unsubstituted quinacridone such as C.I. pigment violet 19, and a solid solution between quinacridone type pigments or between a quinacridone type pigment and another pigment. The form of the pigment may be powdery, granular, or massive. The pigment may be a dry pigment, a wet cake, or a slurry.

(Quinacridone Type Pigment Derivative)

Examples of the quinacridone type pigment derivative (b) preferably include pigment derivatives prepared by introducing a dialkylaminomethyl group, an arylamidomethyl group, a sulfonamide group, a sulfonic acid group and its salt, a phthalimide group, or the like into a pigment structure of a quinacridone type pigment.

Among the above-mentioned quinacridone type derivatives (b) preferably, compounds represented by general formula (1) below are particularly preferable.

[Chem. 1]

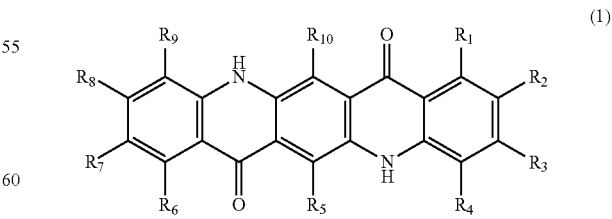

(1)

In the formula (1), $R_1$ to $R_{10}$ each independently represent a hydrogen atom, a chlorine atom, an alkyl group or alkoxy group having 1 to 8 carbon atoms, or a group represented by general formula (2):

[Chem. 2]

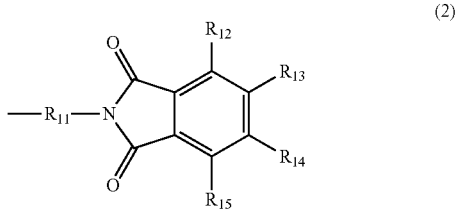

(2)

In the formula (2), R11 represents an alkylene or alkenylene group having 1 to 8 carbon atoms, $R_{12}$ to $R_{15}$ each independently represent a hydrogen atom, an alkyl or alkoxy group having 1 to 8 carbon atoms, or a phenyl group. In formula (1), at least one of $R_1$ to $R_{10}$ represents a group represented by formula (2) above.}

A more preferable compound among the compounds represented by general formula (1) is a compound represented by general formula (3) below.

[Chem. 3]

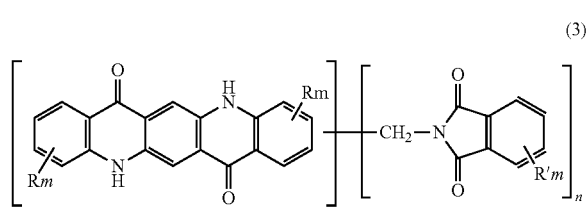

(3)

In the formula (3), R and R' each independently represent a hydrogen atom, a chlorine atom, or an alkyl group or alkoxy group having 1 to 5 carbon atoms, m represents 0, 1, or 2, and n represents 1 to 4)

A compound represented by structural formula (5) below having a group represented by structural formula (4) below is yet more preferable.

[Chem. 4]

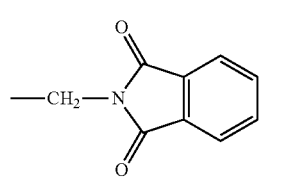

(4)

[Chem. 5]

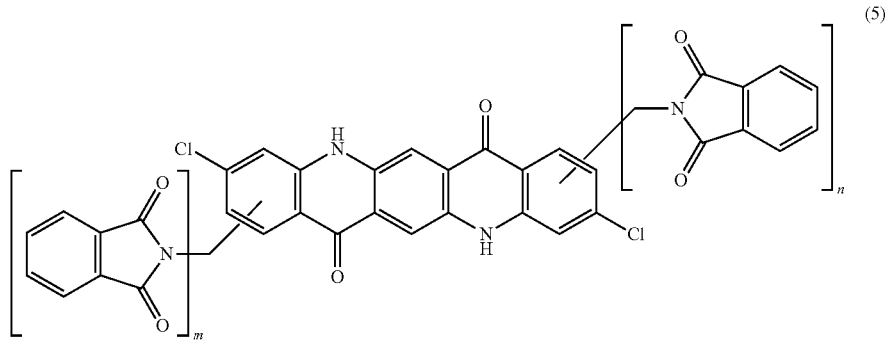

(5)

In the formula (5), m and n each independently represent 0, 1, 2, or 3 but m and n are never zero simultaneously.

The compound represented by chemical structural formula (5) is preferably a compound having one or more groups represented by chemical structural formula (4) per molecule among compounds represented by chemical structural formula (5) and more preferably a compound having one to two such groups on average per molecule. In particular, a compound having 1 to 1.5 such groups on average per molecule is preferable. When an average of one or more groups represented by chemical structural formula (4) are contained per molecule, a higher effect on dispersibility tends to be developed. When an average of two or less such groups are contained per molecule, the effect on the dispersion stability is likely to be further enhanced.

When the compound represented by general formula (1) is a compound having a group represented by chemical structural formula (4), for example, the compound can be synthesized by allowing unsubstituted quinacridone, dimethylquinacridone, dichloroquinacridone, or the like to react with phthalimide and formaldehyde or paraformaldehyde in a concentrated sulfuric acid.

The amount of the quinacridone type pigment derivative (b) used in the water-based pigment dispersion liquid per 100 parts by mass of the quinacridone type pigment (a) is preferably 1 part by mass or more and more preferably 2 to 15 parts by mass. When the amount used is within this range, the storage stability of the water-based dispersion liquid and the ink composition for ink jet recording produced from the water-based dispersion liquid is high. In particular, the ink discharge state is excellent when printing is conducted with a thermal jet printer.

(Styrene-acrylic Acid Type Copolymer)

A styrene-acrylic acid type copolymer (c) contains, as monomer components, a styrenic monomer and at least one of acrylic acid and methacrylic acid.

Known compounds may be used as the styrenic monomer. Examples thereof include styrene, alkylstyrenes such as α-methylstyrene, β-methylstyrene, 2,4-dimethylstyrene, α-ethylstyrene, α-butylstyrene, and α-hexylstyrene, halogenated styrenes such as 4-chlorostyrene, 3-chlorostyrene, and 3-bromostyrene, 3-nitrostyrene, 4-methoxystyrene, and vinyltoluene.

The ratio of the styrenic monomer used as a raw material for the styrene-acrylic acid type copolymer (c) is preferably 50 to 90% by mass and more preferably 70 to 90% by mass. When the ratio of the styrenic monomer is 50% by mass or more, the affinity between the quinacridone type pigment (a) and the styrene-acrylic acid type copolymer (c) is enhanced and the dispersion stability of the water-based pigment dispersion liquid tends to be improved. A plain paper recording property of water-based ink for ink jet recording obtained from that water-based pigment dispersion liquid can be improved, the image recording density tends to be high, and the water resistance tends to be improved. When the amount of the styrenic monomer is within the above mentioned range of 90% by mass or less, the dispersibility of the quinacridone type pigment coated with the styrene-acrylic acid type copolymer (c) in a aqueous medium can be maintained satisfactorily and the dispersibility and the dispersion stability of the pigment in the water-based pigment dispersion liquid can be improved. Moreover, when the liquid is used in an ink composition for ink jet recording, the printing stability can be enhanced.

Although the styrene-acrylic acid type copolymer (c) is obtained by copolymerization of a styrenic monomer and at least one of an acrylic acid monomer and a methacrylic acid monomer, both acrylic acid and methacrylic acid are preferably used. The reason is because copolymerizability during synthesis of the resin is improved, the homogeneity of the resin is improved, and thus the storage stability is improved. As a result, there is a tendency that a water-based pigment dispersion liquid with finer pigment particles is obtained.

In the styrene-acrylic acid type copolymer (c), the total of the styrenic monomer, the acrylic acid monomer, and the methacrylic acid monomer during copolymerization is preferably 95% by mass or higher relative to all monomer components.

The styrene-acrylic acid type copolymer (c) may be copolymerized with a known monomer copolymerizable with the styrenic monomer, the acrylic acid monomer, and the methacrylic acid monomer in addition to these monomers. Examples of such a monomer include acrylic and methacrylic esters such as methyl acrylate, methyl methacrylate, n-propyl acrylate, isopropyl acrylate, n-butyl acrylate, sec-butyl acrylate, tert-butyl acrylate, 2-ethylbutyl acrylate, 1,3-dimethylbutyl acrylate, hexyl acrylate, 2-ethylhexyl acrylate, octyl acrylate, ethyl methacrylate, n-butyl methacrylate, n-methylbutyl methacrylate, pentyl methacrylate, heptyl methacrylate, and nonyl methacrylate; acrylic and methacrylic ester derivatives such as 3-ethoxypropyl acrylate, 3-ethoxybutyl acrylate, dimethylaminoethyl acrylate, 2-hydroxyethyl acrylate, 2-hydroxybutyl acrylate, ethyl-α-(hydroxymethyl)acrylate, dimethylaminoethyl methacrylate, hydroxyethyl methacrylate, and hydroxypropyl methacrylate; acrylic acid aryl esters and acrylic acid aralkyl esters such as phenyl acrylate, benzyl acrylate, phenylethyl acrylate, and phenylethyl methacrylate; monoacrylic esters and monomethacrylic esters of polyhydric alcohols such as diethylene glycol, triethylene glycol, polyethylene glycol, glycerin, and bisphenol A; maleic acid dialkyl esters such as dimethyl maleate and diethyl maleate; and vinyl acetate. One or more of these monomers may be added as monomer components.

The method for producing the styrene-acrylic type acid copolymer (c) may be a common polymerization method. Examples thereof include polymerization methods that use a polymerization catalyst, such as solution polymerization, suspension polymerization, and bulk polymerization. Examples of the polymerization catalyst include 2,2'-azobis (2,4-dimethylvaleronitrile), 2,2'-azobisisobutyronitrile, 1,1'-azobis(cyclohexane-1-carbonitrile), benzoyl peroxide, dibutyl peroxide, and butyl peroxybenzoate. The amount of the polymerization catalyst used is preferably 0.1 to 10.0% by mass of the vinyl monomer component.

The weight-average molecular weight of the styrene-acrylic acid type copolymer (c) used is preferably in a range of 5,000 to 20,000 and more preferably in a range of 5,000 to 18,000. In particular, the weight-average molecular weight is preferably in a range of 5,500 to 15,000. When the weight-average molecular weight is 5,000 or more, the ease of making finer particles by dispersion of the quinacridone type pigment (a) at the initial stage is slightly deteriorated but the long-term storage stability of the water-based pigment dispersion liquid tends to be improved and sedimentation caused by pigment aggregation or the like tends to be suppressed. When the weight-average molecular weight of the styrene-acrylic acid type copolymer (c) is 20,000 or less, the viscosity of an ink composition for ink jet recording prepared from the water-based pigment dispersion liquid using this is highly appropriate and the discharge stability tends to be improved.

The weight-average molecular weight discussed here is a value determined by gel permeation chromatography (GPC) and is a value based on the molecular weight of polystyrene used as the reference substance.

The styrene-acrylic acid type copolymer (c) may be a random copolymer or a graft copolymer. One example of the graft copolymer is a graft copolymer having a main chain or side chain constituted by polystyrene or a copolymer of styrene and a nonionic monomer copolymerizable with styrene and a side chain or main chain constituted by a copolymer of acrylic acid, methacrylic acid, and a styrene-containing monomer. The styrene-acrylic acid type copolymer (c) may be a mixture of a graft copolymer and a random copolymer.

The styrene-acrylic acid type copolymer (c) preferably has carboxyl groups derived from the acrylic acid monomer and the methacrylic acid monomer and an acid value of 120 to 220 mgKOH/g and more preferably 150 to 200 mgKOH/g. As long as the acid value is 120 mgKOH/g or higher, the hydrophilicity is sufficiently high and the dispersion stability of the pigment in the water-based pigment dispersion liquid tends to be improved. When the acid value is 220 mgKOH/g or less, aggregation of the pigment tends to be suppressed further and a print made by using an ink composition for ink jet recording obtained from the water-based pigment dispersion tends to maintain sufficient water resistance.

The mass ratio of the styrene-acrylic acid type copolymer (c) to the total mass of the quinacridone type pigment (a) and the quinacridone type pigment derivative (b), i.e., c/(a+b), in the kneading step is 0.15 to 0.5. The acid value is a value determined in accordance with the Japanese Industrial Standards "K0070: 1992 Test methods for acid value, saponification value, ester value, iodine value, hydroxyl value, and unsaponifiable matter of chemical products" and is the amount in milligrams of potassium hydroxide needed to completely neutralize 1 g of resin.

(Basic Compound)

The styrene-acrylic acid type copolymer (c) is used in the presence of a basic compound (d) in order to neutralize the acrylic acid moiety and improve the dispersibility in a aqueous medium. The basic compound (d) softens the styrene-acrylic acid type copolymer in the kneading step to smoothen the coating process of the pigment with resin and improves the dispersibility of the resin-coated pigment in a aqueous medium. An inorganic basic compound or an organic basic compound may be used as the basic compound (d). Examples of the organic basic compound include amines such as methylamine, dimethylamine, trimethylamine, ethylamine, diethylamine, and triethylamine; and alcohol amines such as triethanolamine, diethanolamine, and methyldiethanolamine. Examples of the inorganic basic compound include hydroxides of alkali metals such as potassium and sodium; carbonates of alkali metals such as potassium and sodium, carbonates of alkaline earth metals such as calcium and barium; and ammonium hydroxide.

The alkali metal hydroxides and alcohol amines are preferable from the viewpoints of dispersibility and storage stability of a water-based pigment dispersion liquid prepared from the pigment dispersion of the present invention and an ink composition for ink jet recording prepared from the water-based pigment dispersion liquid. These alkali metal hydroxides and alcohol amines can be used as a mixture. Among these basic compounds, alkali metal hydroxides such as potassium hydroxide, sodium hydroxide, and lithium hydroxide contribute to decreasing the viscosity of the water-based pigment dispersion liquid and are thus preferable from the viewpoint of stability of discharging for ink jet recording. In particular, potassium hydroxide is preferable.

The basic compound is preferably in the form of an aqueous solution or an organic solvent solution and more preferably used in the form of an aqueous solution. The basic compound (d) concentration in the aqueous solution or the organic solvent solution is preferably 20% by mass to 50% by mass. An alcohol solvent such as methanol, ethanol, isopropanol, or the like is preferably used as the organic solvent dissolving the basic compound (d). Of these, preferably an aqueous solution of a basic compound (d) and more preferably an aqueous solution of an alkali metal hydroxide is used. The amount of the basic compound added is preferably in a range of 80 to 120% in terms of a neutralization ratio on the basis of the acid value of the styrene-acrylic acid type copolymer (b). The neutralization ratio is preferably set to 80% or higher in order to improve the dispersing rate in a aqueous medium in preparing a water-based pigment dispersion liquid from a pigment dispersion, and the dispersion stability and the storage stability of the water-based pigment dispersion liquid. The neutralization ratio is preferably 120% or less in order to prevent gelation of the water-based pigment dispersion or the ink for ink jet recording during long-term storage and to enhance the water resistance of prints prepared using the ink.

Note that, the neutralization ratio is a percentage of the amount of the basic compound blended with respect to the amount needed to neutralize all carboxyl groups in the styrene-acrylic acid type copolymer (b). The neutralization ratio is calculated using the following equation:

$$\text{Neutralization ratio (\%)}=[\{\text{Mass of basic compound (g)}\times56.11\times1000\}/\{\text{Resin acid value (mgKOH/g)}\times\text{Equivalent of basic compound}\times\text{Amount of resin (g)}\}]\times100 \quad [\text{Math. 1}]$$

(Polyoxyalkylene Glycol or its Derivative)

Typically, in kneading a mixture containing resin and a pigment, a particular amount of a water-soluble organic solvent is added to associate the mixture into one clay-like mass having a high solid content, followed by kneading under high shear force. The water-soluble organic solvent used here has a high boiling point and does not evaporate easily during kneading. Moreover, even if the water-soluble organic solvent remains in the kneaded mixture, there is no need to remove the solvent since the solvent can be added as a component of a aqueous medium into the kneaded mixture in the subsequent mixing step.

The polyoxyalkylene glycol or its derivative (e) is one or a mixture of two or more selected from the group consisting of a polyoxyalkylene adduct of glycerin, a polyethylene glycol having a hydroxyl value of 50 to 500 mgKOH/g, and a polypropylene glycol having a hydroxyl value of 150 to 700 mgKOH/g, or its derivative. The polyoxyalkylene adduct of glycerin used includes a polyoxyalkylene group added to at least one site of hydroxyl groups of glycerin. Preferably, polyoxyalkylene groups are added to all sites of the hydroxyl groups and all of the polyoxyalkylene groups on these sites preferably have the same chain length. While publicly known compounds can be used, compounds having a hydroxyl value in a range of 100 mgKOH/g to 600 mgKOH/g are preferable and compounds having a hydroxyl value in a range of 145 mgKOH/g to 500 mgKOH/g are more preferable. When the hydroxyl value is less than 100 mgKOH/g and the dispersion medium system contains a pigment, a styrene-acrylic acid type copolymer, and a polyoxyalkylene adduct of glycerin, the affinity between the pigment and the dispersion medium becomes excessively high compared to the affinity between the pigment and the copolymer, resulting in inhibition of adsorption of the copolymer to the pigment. On the other hand, since the affinity of the dispersion medium to the copolymer tends to be insufficient, the copolymer tends to be difficult to become in a partially dissolved state, i.e., swelling, and therefore, the stabilization of the dispersing pigment by means of the resin adsorption is difficult to be progressed, thereby increasing the number of coarse particles. When the hydroxyl value is larger than 600 mgKOH/g, the affinity between the dispersion medium and the copolymer is improved but the affinity with the pigment is not satisfactory. Thus, the pigment surfaces are difficult to become wet and a clay-like mass suitable for kneading is difficult to form from a mixture of a pigment, a copolymer, and a solvent. As a result, the kneading step does not proceed and the number of coarse particles in the water-based pigment dispersion increases.

The polyoxyalkylene adduct of glycerin used preferably has a polyoxyalkylene structure constituted by one or both of oxyethylene and oxypropylene. When the structure is constituted by both oxyethylene and oxypropylene, oxyethylene and oxypropylene may be randomly arranged or the respective polyoxyalkylenes may be arranged in blocks.

Specific examples of the products include EG-1 (polyethylene oxide adduct of glycerin, hydroxyl value: 133 mgKOH/g, molecular weight: about 1000, product of Lipo Chemical Inc.), Newpol GP-400 (polypropylene oxide adduct of glycerin, hydroxyl value: 400 mgKOH/g, molecular weight: about 400, product of Sanyo Chemical Industries Ltd.), Newpol GP-600 (polypropylene oxide adduct of glycerin, hydroxyl value: 279 mgKOH/g, molecular weight: about 600, product of Sanyo Chemical Industries Ltd.), Newpol GP-1000 (polypropylene oxide adduct of glycerin, hydroxyl value: 160 mgKOH/g, molecular weight: about 1000, product of Sanyo Chemical Industries Ltd.), Sannix GL-600 (polypropylene oxide-polyethylene oxide blocked adduct of glycerin, hydroxyl value: 279 mgKOH/g, molecular weight: 600, product of Sanyo Chemical Industries Ltd.), Newpol GE-600 (ethylene oxide adduct of glycerin, hydroxyl value: 277 mgKOH/g, molecular weight: about 600, product of Sanyo Chemical industries Ltd.).

(Polyethylene Glycol)

The polyethylene glycol used in the present invention has a hydroxyl value in a range of 50 mgKOH/g to 500 mgKOH/g. The hydroxyl value is preferably in a range of 100 mgKOH/g to 500 mgKOH/g and more preferably in a range of 100 mgKOH/g to 400 mgKOH/g. When the hydroxyl value is less than 50 mgKOH/g and the dispersion medium system contains a pigment, a styrene-acrylic acid type copolymer, and a polyethylene glycol, the affinity between the pigment and the dispersion medium is excessively high compared to affinity between the pigment and the copolymer, occurrence of swelling, which indicates that the copolymer is in a partially dissolved state, is suppressed and the number of coarse particles increases due to inhibition of stabilization of the pigment dispersed by resin adsorption. When the hydroxyl value is larger than 500 mgKOH/g, the affinity between the dispersion medium and copolymer is improved but the compatibility with the pigment is not satisfactory. Thus, the pigment surfaces are difficult to wet and a clay-like mass suitable for kneading is difficult to form from a mixture of a pigment, a copolymer, and a solvent. As a result, the kneading step does not proceed and the number of coarse particles in the water-based pigment dispersion liquid increases.

Specific examples of the products include PEG-300 (polyethylene glycol, hydroxyl value: 379 mgKOH/g, molecular weight: about 300, product of Sanyo Chemical Industries Ltd.), PEG-400 (polyethylene glycol, hydroxyl value: 279 mgKOH/g, molecular weight: about 400, product of Sanyo Chemical Industries Ltd.), PEG-600 (polyethylene glycol, hydroxyl value: 192 mgKOH/g, molecular weight: about 600, product of Sanyo Chemical Industries Ltd.), and PEG-1000 (polyethylene glycol, hydroxyl value: 114 mgKOH/g, molecular weight: about 1000, product of Sanyo Chemical Industries Ltd.).

(Polypropylene Glycol)

The polypropylene glycol used has a hydroxyl value in a range of 150 mgKOH/g to 700 mgKOH/g. The hydroxyl value is preferably in a range of 170 mgKOH/g to 600 mgKOH/g and more preferably in a range of 180 mgKOH/g to 500 mgKOH/g. When the hydroxyl value is greater than 700 mgKOH/g and the dispersion medium system contains a pigment, a styrene-acrylic acid type copolymer, and a polypropylene glycol, the affinity between the pigment and the dispersion medium is excessively high compared to affinity between the pigment and the copolymer, occurrence of swelling, which indicates that the copolymer is in a partially dissolved state, is suppressed and the number of coarse particles increases due to inhibition of stabilization of the pigment dispersed by resin adsorption. When the hydroxyl value is less than 150 mgKOH/g, the affinity between the dispersion medium and copolymer is improved but the compatibility with the pigment is not satisfactory. Thus, the pigment surfaces are difficult to wet and a clay-like mass suitable for kneading is difficult to form from a mixture of a pigment, a copolymer, and a solvent. As a result, the kneading step does not proceed and the number of coarse particles in the water-based pigment dispersion increases.

Specific examples of the products include Newpol PP-200 (polypropylene glycol, hydroxyl value: 559 mgKOH/g, molecular weight: about 200, product of Sanyo Chemical Industries Ltd.) and Newpol PP-400 (polypropylene glycol, hydroxyl value: 277 mgKOH/g, molecular weight: about 400, product of Sanyo Chemical Industries Ltd.).

The mass ratio of a specified polyoxyalkylene glycol or its derivative (e) defined in the present application relative to the total mass of the quinacridone type pigment (a) and the quinacridone type pigment derivative (b), i.e., e/(a+b), in the kneading step is 0.3 to 0.8.

In this section, the molecular weight of the various polyoxyalkylene glycols and their derivatives described above are a number-average molecular weight calculated by the equation below:

$$\text{Number-average molecular weight} = 56.11 \times n \text{ (Number of hydroxyl groups in a molecule)/Hydroxyl value (mgKOH/g)} \times 1000 \quad [\text{Math. 2}]$$

In this specification, the hydroxyl value is measured by acetylating the hydroxyl groups (—OH) in a sample and determining the amount (in terms of milligrams per gram of the sample) of potassium hydroxide needed to neutralize acetic acid used in the acetylation and is a parameter indicating the OH group content in the sample. In particular, the measurement was conducted in accordance with the Japanese Industrial Standards "K0070: 1992 Test methods for acid value, saponification value, ester value, iodine value, hydroxyl value, and unsaponifiable matter of chemical products".

(Humectant)

In the production method, a known humectant may be used as a water-soluble organic solvent added during kneading in addition to the particular polyoxyalkylene glycol and its derivative described above. This humectant is also important as a component of a water-based medium added and mixed with a kneaded mixture to dilute the kneaded mixture in a mixing step of adding a water-based medium to the pigment dispersion and mixing following the kneading step. The humectant is also important as a component of water-based ink for ink jet recording. Examples of the humectant include polyols such as glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, trimethylolpropane, and pentaerythritol; polyhydric alcohol alkyl ethers such as diethylene glycol monobutyl ether, tetraethylene glycol monomethyl ether, and propylene glycol monoethyl ether; polyhydric alcohol aryl ethers and polyhydric alcohol aralkyl ethers such as ethylene glycol monophenyl ether and ethylene glycol monobenzyl ether; lactams such as 2-pyrrolidone, N-methyl-2-pyrrolidone, and ε-caprolactam; and 1,3-dimethyl imidazolidinone. These humectants may be used alone or as a mixture of two or more. In particular, polyhydric alcohols having a high boiling point, low volatility, and high surface tension and being liquid at room temperature are preferred. Glycols such as diethylene glycol and triethylene glycol are more preferable.

The humectant other than the specified polyoxyalkylene glycol or its derivative (e) that can be used in kneading preferably has a moderate ability to dissolve the styrene-acrylic acid type copolymer (c) and preferably does not form a homogeneous solution when the humectant and the styrene-acrylic acid type copolymer are stirred with a resin concentration of 25% by mass.

The ratio of the specified polyoxyalkylene glycol or its derivative (e) to the total amount of the specified polyoxyalkylene glycol or its derivative (e) and the humectant described above used in the kneading step is preferably at least 75% by mass. When the ratio of the specified polyoxyalkylene glycol or its derivative (e) is 75% by mass or more, the pigment can be sufficiently disintegrated and dispersed and the number of coarse particles can be effectively reduced.

The method for producing a water-based pigment dispersion liquid will now be described in further detail.

(Kneading Step)

In the kneading step of the production method, a mixture containing a quinacridone type pigment (a), a styrene-acrylic acid type copolymer (c), a basic compound (d), a polyoxyalkylene glycol or its derivative (e), and preferably a quinacridone type pigment derivative (b) is kneaded and a pigment dispersion solid at room temperature is prepared. The polyoxyalkylene glycol or its derivative (e) is at least one selected from the group consisting of a polyoxyalkylene adduct of glycerin, a polyethylene glycol having a hydroxyl value of 50 to 500 mgKOH/g, and a polypropylene glycol having a hydroxyl value of 150 to 700 mgKOH/g. In the production method, a mixture containing a quinacridone type pigment (a), a styrene-acrylic acid type copolymer (c), a basic compound (d), a polyoxyalkylene glycol or its derivative (e), and preferably a quinacridone type pigment derivative (b) is kneaded under high shear force. When kneading is conducted under high shear force, the quinacridone type pigment (a) is finely pulverized and the styrene-acrylic acid type copolymer (c) that became swollen by addition of the polyoxyalkylene glycol or its derivative (e) and the basic compound (d) is forcibly pressed against the pulverized particle surfaces. As a result, the pigment surfaces are smoothly coated and a pigment composition solid at room temperature containing an evenly dispersed pigment is obtained.

In order for the kneading step to proceed while applying high shear force to the mixture, the solid matter concentration in the mixture to be kneaded is preferably 55 to 80% by mass. When kneading is conducted at a solid matter concentration in this range, sufficient shear force can be applied, the quinacridone type pigment (a) is sufficiently pulverized, and a pigment composition solid at room temperature containing an evenly dispersed pigment can be obtained.

The total amount of the specified polyoxyalkylene glycol or its derivative and a humectant added as needed is adjusted so that the solid matter concentration in the mixture kneaded in the kneading step is maintained at such a high level. The total amount of the specific polyoxyalkylene glycol or its derivative and other humectants is preferably in a range of 30 to 80% by mass relative to the total amount of the pigment and the pigment derivative. When the total amount of the polyoxyalkylene glycol or its derivative (e) and the humectant added is within the aforementioned range, solid materials can be easily blended and sufficient shear force can be applied during kneading.

An alkali metal hydroxide used as the basic compound (c) is usually used as an aqueous solution but the amount of water is preferably minimum. The amount of water is preferably 15% by mass or less and more preferably 8% by mass or less relative to the pigment.

In the kneading step, all pigments, pigment derivatives, and the styrene-acrylic acid type copolymer (c) used in the water-based pigment dispersion liquid are blended. The amount of the styrene-acrylic acid type copolymer (c) used relative to 100 parts by mass of the quinacridone type pigment (a) and the quinacridone type pigment derivative (b) is preferably 5 to 50 parts by mass, more preferably 10 to 45 parts by mass, and most preferably 15 to 40 parts by mass. When the amount of the styrene-acrylic acid type copolymer (c) used is 5 parts by mass or more, surfaces of the pigment and the pigment derivative are sufficiently coated with the styrene-acrylic acid type copolymer. Thus, the dispersion stability of the ink for ink jet recording produced from the water-based pigment dispersion liquid tends to be improved and the rubbing resistance of the prints printed with the ink for ink jet recording tends to be improved. When the amount used is 50 parts by mass or less, the resin not adsorbed to the pigment does not remain in the water-based medium in the water-based pigment dispersion liquid or a water-based ink for ink jet recording, the viscosities of the water-based pigment dispersion liquid and the water-based ink are maintained properly, and the discharge property tends to be maintained at a satisfactory level.

The temperature during kneading can be adequately adjusted by considering the temperature characteristics of the styrene-acrylic acid type copolymer (c) so that sufficient shear force is applied to the kneaded material but is preferably lower than the glass transition temperature of the styrene-acrylic acid type copolymer (c) and higher than a temperature 50° C. below the glass transition temperature. When kneading is conducted in such a temperature range, shear force does not decrease due to the decrease in viscosity of the kneaded material accompanying melting of the resin caused by the increase in kneading temperature.

The kneader used in the kneading step may be any kneader that can generate high shear force for a mixture having a high solid component ratio and can be selected from known kneaders. However, use of a kneader having a sealable stirring vessel and a stirring blade is preferable to open-type kneaders such as twin roll kneaders having no stirring vessel. When a kneader having this structure is used, the polyoxyalkylene glycol or its derivative (e), the humectant, water, etc., do not evaporate during kneading and a mixture having a constant solid component ratio can be continuously kneaded, thereby effectively reducing the number of coarse particles. Moreover, the kneaded pigment composition solid at room temperature can be transferred to a mixing step of preparing a water-based pigment dispersion liquid by directly diluting the pigment composition with a water-based medium.

Examples of such kneaders include Henschel mixers, pressure kneaders, Banbury mixers, and planetary mixers. Planetary mixers are particularly preferable. Since kneading is conducted while pigment concentration and the solid matter concentration constituted by the pigment and resin are preferably high, the viscosity of the kneaded mixture varies widely depending on the kneaded state of the kneaded mixture. A planetary mixer can conduct a kneading process in a wide viscosity range compared to twin rollers and the like and the viscosity during kneading and the applied shear force can be easily adjusted since a water-based medium can be added or distilled away under reduced pressure.

(Mixing Step)

In preparing a water-based pigment dispersion liquid by mixing a water-based medium and a pigment dispersion solid at room temperature obtained by the kneading step, the water-based medium is added to the stirring vessel after a solid pigment dispersion is prepared with a kneader having a stirring vessel as described above, mixed, and stirred as needed to directly dilute the pigment dispersion and prepare a water-based pigment dispersion liquid. Alternatively, the solid pigment dispersion and the water-based medium may be mixed in a separate stirrer equipped with a stirring blade and a water-based pigment dispersion liquid can be prepared by stirring as needed. In mixing the water-based medium, all of the water medium needed with respect to the pigment dispersion can be added in one step; however, dilution with the water-based medium can be efficiently conducted and a water-based pigment dispersion liquid can be prepared in a shorter-time by conducting mixing while continuously or intermittently adding the water-based medium in a required amount. The water-based pigment dispersion liquid obtained as such may be further subjected to a dispersing treatment using a disperser. In the production method, pulverization of the pigment and the coating with the styrene-acrylic acid type copolymer proceed effectively. Accordingly, a water-based pigment dispersion liquid having favorable characteristics can be produced merely by mixing a water-based medium to decrease the solid component content and to conduct liquification and by stirring as needed without conducting a dispersing treatment using a disperser and further applying shear force to disintegrate the pigment. However, when coarse dispersed particles remain in the water-based pigment dispersion liquid due to variation in pigment characteristics and the like, conducting the dispersing treatment further pulverizes the remaining coarse dispersed particles and reduce the particle size of the dispersed particles, thereby improving the discharge stability of the ink composition for ink jet recording and the ink jet characteristics such as printing density.

The water-based medium used in preparing a water-based pigment dispersion liquid from the pigment dispersion solid at room temperature may contain a water-soluble organic solvent having a high boiling point in addition to water in order to prevent the water-based pigment dispersion liquid from drying and meet the need to adjust viscosity in conducting a dispersing treatment using a disperser. Examples of the water-soluble organic solvent suitable for use include a specified polyoxyalkylene glycol or its derivative (e) used in the kneading step of the present invention and humectants that can be added in preparing a solid pigment dispersion in the kneading step. The total amount of the water-soluble organic solvent in the water-based pigment dispersion liquid is preferably 1 to 50% by mass and more preferably 3 to 40% by mass. When the amount is lower than the lower limit, the effect of preventing drying tends to be insufficient and when the amount is beyond the upper limit, the dispersion stability of the dispersion liquid tends to be degraded.

Known machines can be used as the disperser for conducting a dispersing treatment. Examples thereof include ultrasonic homogenizers, high-pressure homogenizers, paint shakers, ball mills, roll mills, sand mills, sand grinders, Dyno mill, dispermat, nanomills, SC mills, and nanomizer. These may be used alone or as a combination of two or more machines. The dispersers and the dispersing machines refer to machines dedicated to performing a step of conducting a dispersion treatment and do not include all-purpose mixers and stirrers etc., that are widely used in ordinary mixing and stirring, etc.

The pigment concentration in the water-based pigment dispersion liquid prepared by the mixing step or upon completion of the dispersing treatment after the mixing step is preferably 10 to 20% by mass.

(Preparation of Water-based Ink for Ink Jet Recording)

An water-based ink composition for ink jet recording using the water-based pigment dispersion liquid can be prepared by a known method by diluting the water-based pigment dispersion liquid with a water-based medium and adding various additives as needed. In preparing a water-based ink composition for ink jet recording, coarse particles may be removed by centrifugal separation, filtering, or the like after the preparation of the ink since coarse particles cause nozzle clogging and deterioration of the image characteristics.

In preparing an ink composition for ink jet recording by using the water-based pigment dispersion liquid, the aforementioned specified polyoxyalkylene glycol or its derivative (e) or a humectant whose examples are mentioned previously may be added to prevent drying of ink. The total content of the polyoxyalkylene glycol or its derivative (e) and the humectant for preventing drying relative to the amount of ink is preferably 3 to 50% by mass.

In preparing an ink composition for ink jet recording by using the water-based pigment dispersion liquid, a penetrant may be added to improve the penetrability into a print-receiving medium and to adjust the dot diameter on a recording medium.

Examples of the penetrant include lower alcohols such as ethanol and isopropyl alcohol, ethylene oxide adducts of alkyl alcohols such as ethylene glycol hexyl ether and diethylene glycol butyl ether and propylene oxide adducts of alkyl alcohols such as propylene glycol propyl ether.

The penetrant content in the ink is preferably 0.01 to 10% by mass.

In preparing the ink composition for ink jet recording by using the water-based pigment dispersion liquid, a surfactant may be added to adjust the ink properties such as surface tension. The surfactant that can be added for such a purpose is not particularly limited. Examples of the surfactant include various types of anionic surfactants, nonionic surfactants, cationic surfactants, and ampholytic surfactants. Among these, anionic surfactants and nonionic surfactants are preferable.

Examples of the anionic surfactants include alkyl benzene sulfonic acid salt, alkyl phenyl sulfonic acid salt, alkyl naphthalene sulfonic acid salt, higher fatty acid salt, sulfate ester salt of higher fatty acid ester, sulfonic acid salt of higher fatty acid ester, sulfate ester salt and sulfonic acid salt of higher alcohol ether, higher alkyl sulfosuccinic acid salt, polyoxyethylene alkyl ether carboxylic acid salt, polyoxyethylene alkyl ether sulfuric acid salt, alkyl phosphoric acid salt, and polyoxyethylene alkyl ether phosphoric acid salt. Specific examples thereof include dodecylbenzenesulfonic acid salt, isopropylnaphthalenesulfonic acid salt, monobutylphenylphenolmonosulfonic acid salt, monobutylbiphenylsulfonic acid salt, and dibutylphenylphenoldisulfonic acid salt.

Examples of the nonionic surfactants include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkyl amine, polyoxyethylene fatty acid amide, fatty acid alkylolamide, alkylalkanolamide, acetylene glycol, oxyethylene adduct of acetylene glycol, and polyethylene glycol polypropylene glycol block copolymer. Among these, preferred are polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, acetylene glycol, oxyethylene adduct of acetylene glycol, and polyethylene glycol polypropylene glycol block copolymer.

Other surfactants may also be used such as silicone-based surfactants, e.g., polysiloxaneoxyethylene adduct, fluorine-based surfactants, e.g., perfluoroalkyl carboxylic acid salt, perfluoroalkyl sulfonic acid salt, and oxyethylene perfluoroalkyl ether and biosurfactants, e.g., spiculisporic acid, rhamnolipid, and lysolecithin.

These surfactants may be used alone or in combination as a mixture. Considering the dissolution stability and the like of the surfactants, the HLB is preferably in a range of 7 to 20. When a surfactant is to be added, the amount thereof is preferably in a range of 0.001 to 1% by mass, more preferably in a range of 0.001 to 0.5% by mass, and most preferably in a range of 0.01 to 0.2% by mass relative to the total mass of the ink. When the amount of the surfactant added is 0.001% by mass or more, a favorable effect of adding the surfactant is likely to be developed. When 1% by mass or less of the surfactant is used, problems such as blurring of images and the like tend to be suppressed.

In preparing an ink composition for ink jet recording by using the water-based pigment dispersion liquid of the present invention, a preservative, a viscosity adjuster, a pH adjuster, a chelating agent, a plasticizer, an antioxidant, a UV absorber, and the like may be added.

The total amount of the quinacridone type pigment (a) and the quinacridone type pigment derivative (b) in the water-based pigment in the water-based pigment dispersion liquid is preferably 5 to 25% by mass and more preferably 5 to 20% by mass. When the total amount of the quinacridone type pigment (a) and the quinacridone type pigment derivative (b) is 5% by mass or more, an ink composition for ink jet recording prepared from the water-based pigment dispersion liquid exhibits good coloring performance and a sufficiently high image density tends to be achieved. When the amount is 25% by mass or less, deterioration of the pigment dispersion stability of the water-based pigment dispersion liquid tends to be avoided.

The total amount of the quinacridone type pigment (a) and the quinacridone type pigment derivative (b) in the ink composition for ink jet recording prepared from the water-based pigment dispersion liquid is preferably 1 to 10% by mass from the viewpoints of necessity to obtain a sufficiently high image density and ensuring the dispersion stability of the dispersed particles in the ink.

The ink composition for ink jet recording produced by the production method maintains favorable dispersion stability even when heated and is suitable for use as ink for ink jet recording of various types. The type of ink jet technology to which the ink is applied is not particularly limited. Examples thereof include known techniques such as continuous injection techniques (charge-control types and spraying types) and on-demand techniques (piezoelectric type, thermal type, and electrostatic type).

EXAMPLES

The present invention will now be described in further detail below by using Examples and Comparative Examples for each of the instances where the polyoxyalkylene glycol or its derivative is a polyoxyalkylene adduct of glycerin, a polyethylene glycol, and a polypropylene glycol.
Note that "parts" means parts by mass and "%" means "% by mass" unless otherwise noted.
The resin used in Examples and Comparative Examples is as follows.
Resin A: a styrene-acrylic acid type copolymer having a monomer ratio styrene/acrylic acid/methacrylic acid/butyl acrylate=74/11.3/14.6/0.1 (mass ratio), an observed acid value of 172 mgKOH/g, and a weight-average molecular weight of 11,000.
The weight-average molecular weight is a polystyrene-equivalent value measured with a gel permeation chromatograph (GPC).

(Polyoxyalkylene Adduct of Glycerin)

Examples in which polyoxyalkylene adducts of glycerin were used as a polyoxyalkylene glycol or its derivative and Comparative Examples are presented below to further specifically describe the present invention.

Example 1

A mixture (pigment, pigment derivative, and resin) of powder raw materials among the materials described below was charged in a planetary mixer (trade name: Chemical Mixer ACM04LVTJ-B produced by Aicohsha Manufacturing Co., Ltd.). The jacket was heated. After the temperature of the content reached 80° C., kneading was performed at a rotating velocity of 80 rpm and a revolution velocity of 25 rpm. After 5 minutes, liquid raw materials among the materials described below were added and kneading was continued.
Resin A: 12 parts
Quinacridone type pigment: Cromophtal Jet Magenta 2BC (produced by Ciba Specialty Chemicals): 38 parts Phthalimidomethylated 3,10-dichloroquinacridone (average number of phthalimidomethyl groups per molecule: 1.4): 2 parts
Polyethylene Oxide Adduct of Glycerin
EG-1 (produced by Lipo Chemical Inc.): 20 parts (hydroxyl value: 133 mgKOH/g, molecular weight: about 1300)
34 mass % aqueous potassium hydroxide solution: 6 parts
Kneading was continued until 30 minutes had passed from when the current value of the planetary mixer indicated the maximum value and a pigment dispersion solid at room temperature was obtained. The obtained pigment dispersion solid at room temperature was discharged from the jacket, cut into 1-cm cubes, and placed in a commercially available juicer mixer. Thereto, 70 parts of deionized water was added and mixed with the mixer for 10 minutes to conduct dilution. Thereto, deionized water was further added to obtain a water-based pigment dispersion liquid AA having a quinacridone type pigment concentration of 13.5% by mass.

Examples 2 to 7

Water-based pigment dispersion liquids AB to AG were respectively obtained by conducting Examples 2 to 6 under the same conditions as those in Example 1 except that EG-1 of Example 1 was changed to SANNIX GE-600 (hydroxyl value: 277 mgKOH/g), SANNIX GP-250 (hydroxyl value: 674 mgKOH/g), SANNIX GP-400 (hydroxyl value: 400 mgKOH/g), SANNIX GP-600 (hydroxyl value: 280 mgKOH/g), SANNIX GP-1000 (hydroxyl value: 160 mgKOH/g), and SANNIX GL-600 (hydroxyl value: 279 mgKOH/g) produced by Sanyo Chemical Industries Ltd.

Example 8

A water-based pigment dispersion liquid AH was obtained by conducting Example 8 under the same conditions as those of Example 1 except that the amount of the quinacridone type pigment used in Example 1 was changed to 40 parts and that of phthalimidomethylated 3,10-dichloroquinacridone to 0 parts.

Example 9

A water-based pigment dispersion liquid AI was obtained by conducting Example 9 under the same conditions as those in Example 8 except that EG-1 in Example 8 was changed to GL-600.

Example 10

A mixture having a composition described below was charged in a 50 L planetary mixer PLM-V-50V (produced by Inoue Manufacturing Co., Ltd.). The jacket was heated and kneading was conducted after the jacket temperature reached 60° C. Kneading was performed at a low speed (rotating velocity of 21 rpm and a revolution velocity of 14 rpm) and, 10 minutes after, at a high speed (rotating velocity of 35 rpm and revolution velocity of 24 rpm) to continue kneading.

Resin A: 150 parts
Quinacridone type pigment: Cromophtal Jet Magenta 2BC (produced by Ciba Specialty Chemicals): 475 parts
Phthalimidomethylated 3,10-dichloroquinacridone (average number of phthalimidomethyl groups per molecule: 1.4): 25 parts
Polyethylene oxide adduct of glycerin: EG-1, 220 parts (produced by Lipo Chemical Inc.)

Kneading was continued until 1 hour had passed from when the planetary mixer indicated the maximum current value and a colored resin composition was obtained as a result. The obtained colored resin composition was continuously stirred with the planetary mixer and a total of 1200 parts of deionized water was added over 5 hours. Furthermore, deionized water was further added gradually under stirring so that the quinacridone type pigment concentration was 13.5% by mass. As a result, a water-based pigment dispersion liquid AJ-1 was obtained.

Example 11

Eighteen kilograms of the water-based pigment dispersion liquid AJ-1 prepared in Example 10 was dispersed under the following conditions using a bead mill (Nanomill NM-G2L produced by Asada Iron Works Co., Ltd.) to obtain a pigment dispersion liquid AJ-2.

Dispersing Conditions
Disperser: Nanomill NM-G2L (produced by Asada Iron Works Co., Ltd.)
Beads: zirconia beads 0.3 mm in diameter
Bead charge: 85%
Temperature of cooling water: 10° C.
Speed of rotation: 2660 rpm (disk peripheral speed: 12.5 m/sec)
Liquid delivery: 200 g/10 sec

Comparative Example 1

A water-based pigment dispersion liquid AK was obtained by conducting Comparative Example 1 under the same conditions as in Example 1 except that EG-1 was changed to glycerin.

Comparative Example 2

A water-based pigment dispersion liquid AL was obtained by conducting Comparative Example 2 under the same conditions as in Example 1 except that EG-1 was changed to diethylene glycol.

Comparative Example 3

A water-based pigment dispersion liquid was prepared as in Example 10 except that diethylene glycol was used instead of EG-1 and used as a water-based pigment dispersion liquid AM-1.

Comparative Example 4

A water-based pigment dispersion liquid was prepared as in Example 11 except that diethylene glycol was used instead of EG-1 and used as a water-based pigment dispersion liquid AM-2.

Reference Example 1

To 100 g of a methyl ethyl ketone solution containing 50% of the resin A on a solid basis, a mixed solution containing 153 ml of a commercially available 1 mol/L KOH aqueous solution and 47 ml of deionized water was added while stirring to neutralize the styrene-acryl type resin A. After methyl ethyl ketone was distilled away under reduced pressure, deionized water was added to compensate for the water lost by azeotropy with methyl ethyl ketone. As a result, a resin aqueous solution B containing the resin A and having a solid matter concentration of 20% was obtained.

Next, the following materials were charged in a 250 ml container and a dispersing treatment was conducted for 2 hours using a paint shaker (produced by TOYO SEIKI SEISAKU-SHO, Ltd.). As a result, a water-based pigment water-based dispersion liquid AN having a quinacridone type pigment concentration of 13.5% by mass was obtained.
Styrene-acryl type resin aqueous solution B: 10 g
Quinacridone type pigment: 5.4 g
Cromophtal Jet Magenta 2BC (produced by Ciba Specialty Chemicals), phthalimidomethylated 3,10-dichloroquinacridone: 0.6 g (average number of phthalimidomethyl groups per molecule: 1.4)
Polyethylene oxide adduct of glycerin: 4.8 g
Liponic EG-1 (produced by Lipo Chemical Inc.) (hydroxyl value: 133 mgKOH/g, molecular weight: about 1300)
Deionized water: 19.2 g
Zirconia beads (1.25 mm in diameter): 180 g

Reference Example 2

A water-based pigment dispersion liquid AO was obtained under the same conditions as those in Reference Example 1 except that EG-1 was changed to diethylene glycol.

The water-based pigment dispersion liquids prepared in Examples and Comparative Examples described above were evaluated by the following processes.

(Evaluation of Water-based Pigment Dispersion Liquids)
[Volume-average Particle Diameter]

The water-based pigment dispersion liquids of Examples and Comparative Examples prepared as described above were analyzed with a Microtrac UPA150EX particle sizer analyzer (produced by NIKKISO CO., LTD.) to determine the particle diameter at a cell temperature of 25° C. Each of the particle diameter measurement samples used in the analysis was prepared by diluting a quinacridone type pigment with deionized water so that the concentration was 12.5% by mass and further diluting the resulting diluted solution 500 fold by using deionized water.

[Number of Coarse Particles]

The number of coarse particles was counted by using AccuSizer 780 (Particle Sizing Systems, Inc.). Each of samples for counting coarse particles used in the measurement was prepared by decreasing the quinacridone type pigment concentration by adding deionized water so that the sample was diluted 200 to 10000 fold and that the number of coarse particles having a diameter of 0.5 μm or more passing through a detector at a rate of 1 ml/sec was 1000 to 4000.

After counting the number of coarse particles, the number of coarse particles observed was converted on the basis of the dilution factor into the number of coarse particles present in 1 ml of a water-based pigment dispersion liquid having a quinacridone type pigment concentration of 12.5%.

[Ink Jet Discharge Properties]

Water-based inks for ink jet recording having a composition described below were fabricated from the water-based pigment dispersion liquids prepared in Examples 1 to 9, Comparative Examples 1 and 2, and Reference Examples 1 and 2, respectively, so as to measure the ink jet discharge properties.

Each of the water-based pigment dispersion liquids prepared in Examples 1 to 9, Comparative Examples 1 and 2, and Reference Examples 1 and 2 was diluted with pure water to prepare a diluted liquid of a water-based pigment dispersion liquid, the diluted liquid having a quinacridone type pigment concentration of 6% by mass. Following materials were blended with the resulting diluted liquid.

Diluted liquid of water-based pigment dispersion liquid: 50 parts
2-Pyrrolidinone: 8 parts
Triethylene glycol mono-n-butyl ether: 8 parts
Purified glycerin: 3 parts
Surfynol 440 (produced by Air Products): 0.5 parts
Pure water: 30.5 parts Each water-based ink for ink jet recording prepared as above was tested using an ink jet printer (Photosmart D5360 produced by HP). After the ink was charged in a black cartridge, a nozzle check test pattern was printed at the beginning of the test. After the pattern was printed at a printing density set to 100% over an area of 340 cm$^2$ on an A4 paper sheet in a monochrome mode, the nozzle check test pattern was printed and the state of nozzles before and after the test was compared. The evaluation was conducted as follows:

No missing dots were found: A
1 to 5 missing dots were found: B
6 or more missing dots were found: C

[Storage Stability]

Storage stability of the water-based pigment dispersion liquids prepared in Examples, Comparative Examples, and Reference Examples were evaluated by storing the liquids at 60° C. The amount of change from the initial particle diameter before the test and the particle diameter 6 weeks after the start of the test was evaluated as follows:

The amount of change was 10% or less: A
The amount of change was 11% to 20%: B
The amount of change was 21% or more: C The results are shown in Table 1.

TABLE 1

| | Dispersion liquid | Glycerin adduct or water-soluble organic solvent used in kneading | Glycerin addition | Hydroxyl value | Number-average molecular weight | Main kneading step | Pigment derivative/ (pigment derivative + pigment) (mass ratio) (%) | Volume-average particle diameter (nm) | No. of coarse particles 0.5 μm or larger in diameter (×10$^9$)/ml | Storage stability of dispersion liquid | Ink discharge stability |
|---|---|---|---|---|---|---|---|---|---|---|---|
| Example 1 | AA | Polyoxyethylene adduct (EG-1) | EO | 133 | 1300 | Kneading (0.4 L) | 5 | 92 | 2.66 | A | A |
| Example 2 | AB | Polyoxyethylene adduct (GE-600) | EO | 277 | 600 | Kneading (0.4 L) | 5 | 92 | 2.80 | A | A |
| Example 3 | AC | Polyoxypropylene adduct (GP-250) | PO | 674 | 250 | Kneading (0.4 L) | 5 | 77 | 14.81 | A | A |
| Example 4 | AD | Polyoxypropylene adduct (GP-400) | PO | 400 | 400 | Kneading (0.4 L) | 5 | 93 | 3.55 | A | A |
| Example 5 | AE | Polyoxypropylene adduct (GP-600) | PO | 280 | 600 | Kneading (0.4 L) | 5 | 90 | 4.34 | A | A |
| Example 6 | AF | Polyoxypropylene adduct (GP-1000) | PO | 160 | 1000 | Kneading (0.4 L) | 5 | 82 | 9.23 | A | A |
| Example 7 | AG | Polyoxyethylene/ polyoxypropylene adduct (GL-600) | EO/PO | 279 | 600 | Kneading (0.4 L) | 5 | 75 | 1.98 | A | A |
| Example 8 | AH | Polyoxyethylene adduct (EG-1) | EO | 133 | 1300 | Kneading (0.4 L) | 0 | 133 | 11.3 | B | B |
| Example 9 | AI | Polyoxyethylene/ polyoxypropylene adduct (GL-600) | EO/PO | 279 | 600 | Kneading (0.4 L) | 0 | 138 | 2.18 | B | B |
| Example 10 | AJ-1 | Polyoxyethylene adduct (EG-1) | EO | 133 | 1300 | Kneading (50 L) | 5 | 85 | 1.40 | A | A |
| Example 11 | AJ-2 | Polyoxyethylene adduct (EG-1) | EO | 133 | 1300 | Kneading (50 L), bead dispersion | 5 | 83 | 1.28 | A | A |
| CE.* 1 | AK | Glycerin | — | — | — | Kneading (0.4 L) | 5 | 250 | 133.05 | C | C |
| CE. 2 | AL | Diethylene glycol | — | — | — | Kneading (0.4 L) | 5 | 201 | 42.30 | C | C |
| CE. 3 | AM-1 | Diethylene glycol | — | — | — | Kneading (50 L) | 5 | 108 | 23.33 | C | C |
| CE. 4 | AM-2 | Diethylene glycol | — | — | — | Kneading (50 L), bead dispersion | 5 | 92 | 20.34 | C | C |

TABLE 1-continued

| | Dispersion liquid | Glycerin adduct or water-soluble organic solvent used in kneading | Glycerin addition | Hydroxyl value | Number-average molecular weight | Main kneading step | Pigment derivative/ (pigment derivative + pigment) (mass ratio) (%) | Volume-average particle diameter (nm) | No. of coarse particles 0.5 μm or larger in diameter (×10⁹)/ml | Storage stability of dispersion liquid | Ink discharge stability |
|---|---|---|---|---|---|---|---|---|---|---|---|
| RE.** 1 | AN | Polyoxyethylene adduct (EG-1) | EO | 133 | 1300 | Paint shaker | 5 | 214 | 49.50 | C | C |
| RE. 2 | AO | Diethylene glycol | — | — | — | Paint shaker | 5 | 205 | 35.33 | C | C |

Kneading (0.4 L): Kneading performed with Chemical Mixer ACM04LVTJ-B (capacity: 0.4 L, produced by Aicohsha Manufacturing Co., Ltd.)
Kneading (50 L): Kneading performed with Planetary Mixer PLM-50 (capacity: 50 L, produced by Inoue Manufacturing Co., Ltd.)
Bead dispersion: Dispersion performed with Nanomill NM-G2L (produced by Asada Iron Works Co., Ltd.)
Paint shaker: Kneading conducted with paint shaker
No. of coarse particles 0.5 μm or larger in diameter is a converted figure on a basis of a water-based pigment dispersion liquid having a quinacridone type pigment concentration of 12.5% by mass.
CE.*: Comparative Example
RE.**: Reference Example Comparison between Examples 1 to 9 and Comparative Examples 1 and 2 clearly shows that use of a polyoxyalkylene adduct of glycerin as a water-soluble organic solvent in the kneading step decreases the number of coarse particles in the water-based pigment dispersion liquids. Comparison between Examples 1 to 7 and Examples 8 and 9 shows that addition of a pigment derivative is necessary to decrease the number of the coarse particles in the pigment dispersion liquid and reduce the volume-average particle diameter. Comparison between Example 10 and Example 11 shows that adding a step of performing a dispersing treatment after the mixing step in the production method does not significantly decrease the number of the coarse particles and the volume-average particle diameter and that the reduction of the coarse particles and volume-average particle diameter is sufficiently achieved only by the kneading step. Comparative Examples 3 and 4 show that the reduction of the coarse particles is not sufficiently achieved when the polyoxyalkylene adduct of glycerin used is not used in the kneading step despite performing the kneading step during the production. In such a case, the number of coarse particles may be slightly but not significantly reduced when a dispersing treatment using a disperser and media is conducted subsequent to the kneading step. Rather, the number of coarse particles can be far satisfactorily decreased by using a polyoxyalkylene adduct of glycerin from the beginning of the kneading step without conducting the dispersing treatment.

Reference Examples show that when a water-based pigment dispersion liquid is prepared by using a paint conditioner, both the number of the coarse particles and the volume-average particle diameter are significantly high compared to the case when a water-pigment dispersion liquid is prepared by using a kneading step. These values are not significantly improved even when a polyoxyalkylene adduct of glycerin is added. It is also clear that a pigment dispersion liquid that has a large number of coarse particles and a high volume-average particle diameter have poor storage stability and ink discharge stability. As described above, when a polyoxyalkylene adduct of glycerin is used as a water-soluble organic solvent and kneading is conducted by adding a pigment derivative in dispersing a quinacridone type pigment, a water-based pigment dispersion liquid containing significantly fewer poorly dispersed coarse particles can be produced by merely adding and mixing a water-based medium to and with the pigment dispersion prepared in a kneading step and stirring the resulting mixture as needed, thereby not requiring a conventional dispersing step that uses a disperser. As a result, a water-based pigment dispersion liquid and a water-based ink for ink jet recording can be obtained which contain stably dispersed pigments and maintain a satisfactory dispersion state during long-term storage. Moreover, a method for producing a water-based pigment dispersion liquid that takes a shorter time for production and offers high production efficiencies is realized.

(Polyethylene Glycol)

Examples in which polyethylene glycol was used as a polyoxyalkylene glycol or its derivative and Comparative Examples are presented below to further specifically describe the present invention.

Example 12

A mixture (pigment, pigment derivative, and resin) of powder raw materials among the materials described below was charged in a planetary mixer (trade name: Chemical Mixer ACM04LVTJ-B produced by Aicohsha Manufacturing Co., Ltd.). The jacket was heated. After the temperature of the content reached 80° C., kneading was performed at a rotating velocity of 80 rpm and a revolution velocity of 25 rpm. After 5 minutes, liquid raw materials among the materials described below were added and kneading was continued.

Resin A: 12 parts
Quinacridone type pigment: Cromophtal Jet Magenta 2BC (produced by Ciba Specialty Chemicals): 38 parts
Phthalimidomethylated 3,10-dichloroquinacridone (average number of phthalimidomethyl groups per molecule: 1.4): 2 parts
Polyethylene Glycol
PEG-300 (produced by Sanyo Chemical Industries Ltd.): 20 parts (hydroxyl value: 379 mgKOH/g, molecular weight: about 300) 34 mass % aqueous potassium hydroxide solution: 6 parts Kneading was continued until 30 minutes had passed from when the current value of the planetary mixer indicated the maximum value and a pigment dispersion solid at room temperature was obtained. The obtained pigment dispersion solid at room temperature was discharged from the jacket, cut into 1-cm cubes, and placed in a commercially available juicer mixer. Thereto, 70 parts of deionized water was added and mixed with the mixer for 10 minutes to conduct dilution. Thereto, deionized water was, further added to obtain a water-based pigment dispersion liquid BA having a quinacridone type pigment concentration of 13.5% by mass.

Examples 13 to 15

Water-based pigment dispersion liquids BB to BD were respectively obtained by conducting Examples 13 to 15 under the same conditions as those in Example 12 except that PEG-300 of Example 12 was changed to PEG-400 (hydroxyl value: 279 mgKOH/g), PEG-600 (hydroxyl value: 192 mgKOH/g), and PEG-1000 (hydroxyl value: 114 mgKOH/g) produced by Sanyo Chemical Industries Ltd.

Example 16

A water-based pigment dispersion liquid BE was obtained by conducting Example 16 under the same conditions as those of Example 12 except that the amount of the quinacridone type pigment used in Example 12 was changed to 40 parts and that of phthalimidomethylated 3,10-dichloroquinacridone to 0 parts.

Example 17

A mixture having a composition described below was charged in a 50 L planetary mixer PLM-V-50V (produced by Inoue Manufacturing Co., Ltd.). The jacket was heated and kneading was conducted after the jacket temperature reached 60° C. Kneading was performed at a low speed (rotating velocity of 21 rpm and a revolution velocity of 14 rpm) and, 10 minutes after, at a high speed (rotating velocity of 35 rpm and revolution velocity of 24 rpm) to continue kneading.
Resin A: 150 parts
Quinacridone type pigment: Cromophtal Jet Magenta 2BC (produced by Ciba Specialty Chemicals): 475 parts
Phthalimidomethylated 3,10-dichloroquinacridone (average number of phthalimidomethyl groups per molecule: 1.4): 25 parts
Polyethylene glycol: PEG-400 (produced by Sanyo Chemical Industries Ltd.): 220 parts
Kneading was continued until 1 hour had passed from when the planetary mixer indicated the maximum current value and a colored resin composition was obtained as a result. The obtained colored resin composition was continuously stirred with the planetary mixer and a total of 1200 parts of deionized water was added over 5 hours. Furthermore, deionized water was further added gradually under stirring so that the quinacridone type pigment concentration was 13.5% by mass. As a result, a water-based pigment dispersion liquid BF-1 was obtained.

Example 18

Eighteen kilograms of the water-based pigment dispersion liquid BF-1 prepared in Example 17 was dispersed under the following conditions using a bead mill (Nanomill NM-G2L produced by Asada Iron Works Co., Ltd.) to obtain a pigment dispersion liquid BF-2.
Dispersing Conditions
Disperser: Nanomill NM-G2L (produced by Asada Iron Works Co., Ltd.)
Beads: zirconia beads 0.3 mm in diameter
Bead charge: 85%
Temperature of cooling water: 10° C.
Speed of rotation: 2660 rpm (disk peripheral speed: 12.5 m/sec)
Liquid delivery: 200 g/10 sec

Comparative Example 5

A water-based pigment dispersion liquid BG was obtained by conducting Comparative Example 1 under the same conditions as those in Example 12 except that PEG-300 was changed to PEG-200 (hydroxyl value: 569 mgKOH/g).

Reference Example 3

To 100 g of a methyl ethyl ketone solution containing 50% of the resin A on a solid basis, a mixed solution containing 153 ml of a commercially available 1 mol/L KOH aqueous solution and 47 ml of deionized water was added while stirring to neutralize the styrene-acryl type resin A. After methyl ethyl ketone was distilled away under reduced pressure, deionized water was added to compensate for the water lost by azeotropy with methyl ethyl ketone. As a result, a resin aqueous solution B containing the resin A and having a solid matter concentration of 20% was obtained.

Next, the following materials were charged in a 250 ml container and a dispersing treatment was conducted for 2 hours using a paint shaker (produced by TOYO SEIKI SEISAKU-SHO, Ltd.). As a result, a water-based pigment water-based dispersion liquid BH having a quinacridone type pigment concentration of 13.5% by mass was obtained.
Styrene-acryl type resin aqueous solution B: 10 g
Quinacridone type pigment: 5.4 g
Cromophtal Jet Magenta 2BC (produced by Ciba Specialty Chemicals), phthalimidomethylated 3,10-dichloroquinacridone: 0.6 g (average number of phthalimidomethyl groups per molecule: 1.4)
PEG-400: 4.8 g
Deionized water: 19.2 g
Zirconia beads (1.25 mm dia.): 180 g Water-based pigment dispersion liquids prepared in Examples 12 to 18, Comparative Example 5, and Reference Example 3 were used to measure the volume-average particle diameter, the number of coarse particles, the ink jet discharge property, and storage stability through the measurement processes described above. The results are shown in Table 2. In Table 2, the results of Comparative Example 2 to 4 and Reference Example 2 are also shown to facilitate understanding of the tendency of the measurement results.

TABLE 2

| | Dispersion liquid | Glycerin adduct or water-soluble organic solvent used in kneading | Hydroxyl value | Number-average molecular weight | Main kneading step | Pigment derivative/ (pigment derivative + pigment) (mass ratio) (%) | Volume-average particle diameter (nm) | No. of coarse particles 0.5 μm or larger in diameter (×10$^9$)/ml | Storage stability of dispersion liquid | Ink discharge stability |
|---|---|---|---|---|---|---|---|---|---|---|
| Example 12 | BA | Polyethylene glycol (PEG-300) | 379 | 300 | Kneading (0.4 L) | 5 | 86 | 2.434 | A | A |
| Example 13 | BB | Polyethylene glycol (PEG-400) | 279 | 400 | Kneading (0.4 L) | 5 | 87 | 2.204 | A | A |

TABLE 2-continued

| | Dispersion liquid | Glycerin adduct or water-soluble organic solvent used in kneading | Hydroxyl value | Number-average molecular weight | Main kneading step | Pigment derivative/ (pigment derivative + pigment) (mass ratio) (%) | Volume-average particle diameter (nm) | No. of coarse particles 0.5 μm or larger in diameter ($\times 10^9$)/ml | Storage stability of dispersion liquid | Ink discharge stability |
|---|---|---|---|---|---|---|---|---|---|---|
| Example 14 | BC | Polyethylene glycol (PEG-600) | 192 | 600 | Kneading (0.4 L) | 5 | 85 | 2.629 | A | A |
| Example 15 | BD | Polyethylene glycol (PEG-1000) | 114 | 1000 | Kneading (0.4 L) | 5 | 87 | 3.406 | A | A |
| Example 16 | BE | Polyethylene glycol (PEG-400) | 279 | 400 | Kneading (0.4 L) | 0 | 141 | 8.470 | B | B |
| Example 17 | BF-1 | Polyethylene glycol (PEG-400) | 279 | 400 | Kneading (50 L) | 5 | 76 | 4.139 | A | A |
| Example 18 | BF-2 | Polyethylene glycol (PEG-400) | 279 | 400 | Kneading (50 L), bead dispersion | 5 | 80 | 2.326 | A | A |
| CE.* 5 | BG | Polyethylene glycol (PEG-200) | 569 | 200 | Kneading (0.4 L) | 5 | 250 | 14.357 | C | C |
| CE. 2 | AL | Diethylene glycol | 1057 | 92 | Kneading (0.4 L) | 5 | 201 | 42.300 | C | C |
| CE. 3 | AM-1 | Diethylene glycol | 1057 | 92 | Kneading (50 L) | 5 | 108 | 23.330 | C | C |
| CE. 4 | AM-2 | Diethylene glycol | 1057 | 92 | Kneading (50 L), bead dispersion | 5 | 92 | 20.340 | C | C |
| RE.** 3 | BH | Polyethylene glycol (PEG-400) | 279 | 400 | Paint shaker | 5 | 218 | 40.313 | C | C |
| RE. 2 | AO | Diethylene glycol | 1057 | 92 | Paint shaker | 5 | 205 | 35.338 | C | C |

Kneading (0.4 L): Kneading performed with Chemical Mixer ACM04LVTJ-B (capacity: 0.4 L, produced by Aicohsha Manufacturing Co., Ltd.)
Kneading (50 L): Kneading performed with Planetary Mixer PLM-50 (capacity: 50 L, produced by Inoue Manufacturing Co., Ltd.)
Bead dispersion: Dispersion performed with Nanomill NM-G2L (produced by Asada Iron Works Co., Ltd.)
Paint shaker: Kneading conducted with paint shaker
No. of coarse particles 0.5 μm or larger in diameter is a converted figure on a basis of a water-based pigment dispersion liquid having a quinacridone type pigment concentration of 12.5% by mass.
CE.*: Comparative Example
RE.**: Reference Example Comparison between Examples 12 to 15 and Comparative Examples 5 and 2 clearly shows that use of polyethylene glycol having a hydroxyl value of 50 to 500 as a water-soluble organic solvent in the kneading step significantly decreases the number of coarse particles in the water-based pigment dispersion liquids. It is clear that in order to reduce the number of coarse particles in the pigment dispersion liquid and decrease the volume-average particle diameter, addition of polyethylene glycol having a hydroxyl value of 50 to 500 is necessary. Comparison between Example 13 and Example 16 shows that addition of a quinacridone type pigment derivative in the kneading step is preferred. Comparison between Example 12 to 15 and Example 17 shows that use of a large kneader having a capacity close to an actual production machine tends to decrease shear force and increase the number of coarse particles. In such a case, the number of coarse particles can be decreased by performing a dispersing treatment using a disperser and media (Example 18). However, even when such a dispersing treatment is not conducted, the number of coarse particles is significantly less compared to when a large-capacity kneader is used with diethylene glycol as in the related art (Comparative Examples 3 and 4). It is clear that as long as diethylene glycol or polyethylene glycol having a hydroxyl value larger than 500 is used, the number of the coarse particles as small as that achieved by Example 17 is not realized even when a smaller kneader having high kneading efficiencies is used (Comparative Examples 5 and 2) or even when a bead mill is used after the kneading step to reduce the number of the coarse particles (Comparative Example 4). Accordingly, compared to a conventional production method in which a kneading step is performed using a dispersion medium such as diethylene glycol followed by a dispersing step using a disperser using media, the production method set forth in this application achieves sufficient reduction in volume-average particle diameter and number of coarse particles only by performing a kneading step.

Reference Examples 3 and 2 show that when a water-based pigment dispersion liquid is prepared by using a paint conditioner, both the number of the coarse particles and the volume-average particle diameter are significantly high compared to the case where a water-pigment dispersion liquid is prepared by using a kneading step. These values do not improve even when a polyethylene glycol having an acid value of 50 to 500 is added. It is clear that even when a water-based pigment dispersion liquid is produced by using polyethylene glycol and a quinacridone type pigment derivative, the effect of the polyethylene glycol on reducing the number of coarse particles is not at all exhibited unless the step of kneading a mixture containing polyethylene glycol and the quinacridone type pigment derivative at a high solid matter ratio is performed. As described above, when a polyethylene glycol having a hydroxyl value of 50 to 500 is used as a water-soluble organic solvent in dispersing a quinacridone type pigment, a water-based pigment dispersion liquid containing significantly fewer poorly dispersed coarse particles can be produced by merely adding and mixing an aqueous medium to and with the pigment dispersion prepared in a kneading step and stirring the resulting mixture as needed, thereby not requiring a conventional dispersing step that uses a disperser. As a result, a water-based pigment dispersion liquid and a water-based ink for ink jet recording can be obtained which contain stably dispersed pigments, maintain a satisfactory dispersion state during long-term storage, and contain fewer coarse particles. A water-based pigment dispersion liquid can be produced in a shorter time by a highly efficient production method.

(Polypropylene Glycol)

Examples in which polypropylene glycol was used as a polyoxyalkylene glycol or its derivative and Comparative Examples for Examples are presented below to further specifically describe the present invention.

Example 19

A mixture (pigment, pigment derivative, and resin) of powder raw materials among the materials described below was charged in a planetary mixer (trade name: Chemical Mixer ACM04LVTJ-B produced by Aicohsha Manufacturing Co., Ltd.). The jacket was heated. After the temperature of the content reached 80° C., kneading was performed at a rotating velocity of 80 rpm and a revolution velocity of 25 rpm. After 5 minutes, liquid raw materials among the materials described below were added and kneading was continued.

Resin A: 12 parts
Quinacridone type pigment: Cromophtal Jet Magenta 2BC (produced by Ciba Specialty Chemicals): 38 parts
Phthalimidomethylated 3,10-dichloroquinacridone (average number of phthalimidomethyl groups per molecule: 1.4): 2 parts
Polypropylene Glycol
PP-200 (produced by Sanyo Chemical Industries Ltd.): 20 parts (hydroxyl value: 559 mgKOH/g, molecular weight: about 200) 34 mass % aqueous potassium hydroxide solution: 6 parts Kneading was continued until 30 minutes had passed from when the current value of the planetary mixer indicated the maximum value and a pigment dispersion solid at room temperature was obtained. The obtained pigment dispersion solid at room temperature was discharged from the jacket, cut into 1-cm cubes, and placed in a commercially available juicer mixer. Thereto, 70 parts of deionized water was added and mixed with the mixer for 10 minutes to conduct dilution. Thereto, deionized water was further added to obtain a water-based pigment dispersion liquid CA having a quinacridone type pigment concentration of 12.5% by mass.

Example 20

Water-based pigment dispersion liquid CB was obtained by conducting Example 20 under the same conditions as those in Example 19 except that PP-200 in Example 19 was changed to PP-400 produced by Sanyo Chemical Industries Ltd., (hydroxyl value: 277 mgKOH/g).

Example 21

A water-based pigment dispersion liquid CC was obtained by conducting Example 21 under the same conditions as those of Example 19 except that the amount of the quinacridone type compound used in Example 19 was changed to 40 parts and that of phthalimidomethylated 3,10-dichloroquinacridone to 0 parts.

Comparative Example 6

Comparative Example 6 was conducted under the same conditions as those in Example 19 except that PP-200 in Example 19 was changed to PP-950 produced by Sanyo Chemical Industries Ltd., (hydroxyl value: 119 mgKOH/g) to obtain a water-based pigment dispersion liquid CD.

Comparative Example 7

A water-based pigment dispersion liquid CE was obtained by conducting Comparative Example 7 under the same conditions as in Example 19 except that PP-200 was changed to dipropylene glycol.

Reference Example 4

To 100 g of a methyl ethyl ketone solution containing 50% of the resin A on a solid basis, a mixed solution containing 153 ml of a commercially available 1 mol/L KOH aqueous solution and 47 ml of deionized water was added while stirring to neutralize the styrene-acryl type resin A. After methyl ethyl ketone was distilled away under reduced pressure, deionized water was added to compensate for the water lost by azeotropy with methyl ethyl ketone. As a result, a resin aqueous solution B containing the resin A and having a solid matter concentration of 20% was obtained.

Next, the following materials were charged in a 250 ml container and a dispersing treatment was conducted for 2 hours using a paint shaker (produced by TOYO SEIKI SEISAKU-SHO, Ltd.). As a result, a water-based pigment water-based dispersion liquid CF having a quinacridone type pigment concentration of 13.5% by mass was obtained.

Styrene-acryl type resin aqueous solution B: 10 g
Quinacridone type pigment: 5.4 g
Cromophtal Jet Magenta 2BC (produced by Ciba Specialty Chemicals), phthalimidomethylated 3,10-dichloroquinacridone: 0.6 g (average number of phthalimidomethyl groups per molecule: 1.4)
PP-200: 4.8 g
Deionized water: 19.2 g
Zirconia beads (1.25 mm dia.): 180 g

TABLE 3

| | Dispersion liquid | Water-based organic solvent used in kneading | Hydroxyl value | Number-average molecular weight | Main kneading step | Pigment derivative/ (pigment derivative + pigment) (mass ratio) (%) | Volume-average particle diameter (nm) | No. of coarse particles 0.5 μm or larger in diameter ($\times 10^9$)/ml | Storage stability of dispersion liquid | Ink discharge stability |
|---|---|---|---|---|---|---|---|---|---|---|
| Example 19 | CA | Polypropylene glycol (PP-200) | 559 | 200 | Kneading (0.4 L) | 5 | 86 | 4.13 | A | A |
| Example 20 | CB | Polypropylene glycol (PP-400) | 277 | 400 | Kneading (0.4 L) | 5 | 87 | 16.07 | A | A |

TABLE 3-continued

| | Dispersion liquid | Water-based organic solvent used in kneading | Hydroxyl value | Number-average molecular weight | Main kneading step | Pigment derivative/ (pigment derivative + pigment) (mass ratio) (%) | Volume-average particle diameter (nm) | No. of coarse particles 0.5 μm or larger in diameter (×10$^9$)/ml | Storage stability of dispersion liquid | Ink discharge stability |
|---|---|---|---|---|---|---|---|---|---|---|
| Example 21 | CC | Polypropylene glycol (PP-200) | 559 | 200 | Kneading (0.4 L) | 0 | 181 | 2.50 | B | B |
| CE.* 6 | CD | Polypropylene glycol (PP-950) | 119 | 950 | Kneading (0.4 L) | 5 | | Kneaded and added | | |
| CE. 7 | CE | Dipropylene glycol | 830 | 137 | Kneading (0.4 L) | 5 | 115 | 18.28 | C | B |
| CE. 2 | AL | Diethylene glycol | 1057 | 92 | Kneading (0.4 L) | 5 | 201 | 42.30 | C | C |
| RE.** 4 | CF | Polypropylene glycol (PP-200) | 559 | 40 | Paint shaker | 5 | 142 | 14.16 | C | C |
| RE. 2 | AO | Diethylene glycol | 1057 | 92 | Paint shaker | 5 | 205 | 35.338 | C | C |

Kneading (0.4 L): Kneading performed with Chemical Mixer ACM04LVTJ-B (capacity: 0.4 L, produced by Aicohsha Manufacturing Co., Ltd.)
Kneading (50 L): Kneading performed with Planetary Mixer PLM-50 (capacity: 50 L, produced by Inoue Manufacturing Co., Ltd.)
Bead dispersion: Dispersion performed with Nanomill NM-G2L (produced by Asada Iron Works Co., Ltd.)
Paint shaker: Kneading conducted with paint shaker
No. of coarse particles 0.5 μm or larger in diameter is a converted figure on a basis of a water-based pigment dispersion liquid having a quinacridone type pigment concentration of 12.5% by mass.
CE.*: Comparative Example
RE.**: Reference Example Comparison between Examples 19 to 21 and Comparative Examples 6 and 7 clearly shows that use of polypropylene glycol having a hydroxyl value of 150 to 700 as a water-soluble organic solvent in the kneading step significantly decreases the number of coarse particles in the water-based pigment dispersion liquids. It is clear that in order to reduce the number of coarse particles in the pigment dispersion liquid and decrease the volume-average particle diameter, addition of polypropylene glycol having a hydroxyl value of 150 to 700 is necessary. Comparative Example 6 shows that when the hydroxyl value is less than 150, the pigment surfaces cannot be sufficiently wetted with the dispersion medium and kneading cannot be conducted. When the hydroxyl value is larger than 700, kneading is possible but the pigment is not sufficiently coated with the copolymer and the storage stability and the discharge stability are degraded. Comparison between Example 19 and Example 21 shows that addition of the quinacridone type pigment derivative is preferred since it decreases the volume-average particle diameter and improves the storage stability of the dispersion liquid and the discharge stability of the ink.

Reference Examples 4 and 2 show that when a water-based pigment dispersion liquid is prepared by using a paint conditioner, both the number of the coarse particles and the volume-average particle diameter are significantly high compared to the case where a water-pigment dispersion liquid is prepared by using a kneading step. These values do not improve even when a polypropylene glycol having a hydroxyl value of 150 to 700 is added. It is clear that even when a water-based pigment dispersion liquid is produced by using polypropylene glycol and a quinacridone type pigment derivative, the effect of reducing the number of coarse particles is not at all exhibited unless the step of kneading a mixture containing polypropylene glycol and the quinacridone type pigment derivative at a high solid matter ratio is performed. As described above, when a polypropylene glycol having a hydroxyl value of 150 to 700 is used as a water-soluble organic solvent in dispersing a quinacridone type pigment, a water-based pigment dispersion liquid containing significantly fewer poorly dispersed coarse particles can be produced. As a result, a water-based pigment dispersion liquid and a water-based ink for ink jet recording can be obtained which contain stably dispersed pigments, maintain a satisfactory dispersion state during long-term storage, contain fewer coarse particles, and have good ink discharge stability. A water-based pigment dispersion liquid can be produced in a shorter time by a highly efficient production method.

A water-based pigment dispersion liquid produced by a method for producing a water-based pigment dispersion liquid according to the present invention is used as a main component for producing a water-based ink for ink jet recording. A water-based ink for ink jet recording having high discharge stability can be produced.

The invention claimed is:

1. A method for producing a water-based pigment dispersion liquid, the method comprising:
   kneading a mixture comprising a quinacridone pigment (a), a styrene-acrylic acid copolymer (c), a basic compound (d), and a polyoxyalkylene glycol or its derivative (e) to prepare a pigment dispersion that is solid at room temperature, and
   mixing an aqueous medium with the pigment dispersion, wherein the polyoxyalkylene glycol or its derivative (e) is a polyoxyalkylene adduct of glycerin, wherein the solid content concentration in the pigment dispersion in the kneading step is 55 to 80% by mass.

2. The method for producing a water-based pigment dispersion liquid according to claim 1, wherein the polyoxyalkylene structure of the polyoxyalkylene adduct of glycerin is constituted by oxyethylene and/or oxypropylene.

3. The method for producing a water-based pigment dispersion liquid according to claim 1, wherein the hydroxyl value of the polyoxyalkylene adduct of glycerin (e) is 100 to 600 mgKOH/g.

4. The method for producing a water-based pigment dispersion liquid according to claim 1, wherein the styrene-acrylic acid copolymer has an acid value of 120 to 220 mgKOH/g, and a weight-average molecular weight of 5000 to 20000 and wherein the styrene-acrylic acid copolymer contains 50 to 90% by mass of a styrenic monomer unit relative to all monomer components.

5. The method for producing a water-based pigment dispersion liquid according to claim 1, wherein the mixture further comprises a quinacridone pigment derivative (b).

6. The method for producing a water-based pigment dispersion liquid according to claim 5, wherein the quinacridone pigment derivative (b) is a phthalimidomethylated quinacridone compound.

7. The method for producing a water-based pigment dispersion liquid according to claim 5,
   wherein the mass ratio of the styrene-acrylic acid copolymer (c) to the total mass of the quinacridone pigment (a) and the quinacridone pigment derivative (b), in the kneading step is 0.15 to 0.5, and
   wherein the mass ratio of the polyoxyalkylene glycol or its derivative (e) to the total mass of the quinacridone pigment (a) and the quinacridone pigment derivative (b), in the kneading step is 0.3 to 0.8.

8. The method for producing a water-based pigment dispersion liquid according to claim 1, wherein the water-based pigment dispersion liquid is used as a main component for producing a water-based ink for ink jet recording.

9. The method for producing a water-based pigment dispersion liquid according to claim 1, wherein the pigment dispersion is prepared in the step of kneading such that the styrene-acrylic acid copolymer (c) swells, thereby adsorbing the swelling styrene-acrylic acid copolymer (c) to the pigment (a).

* * * * *